Figure 1:
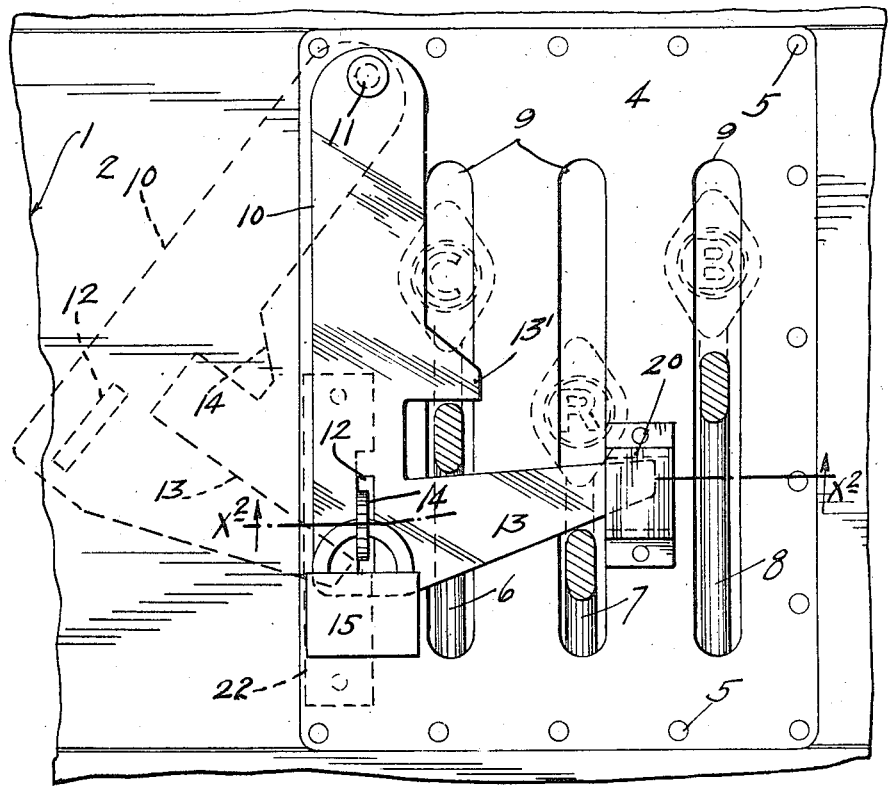

W. R. McKINNON & C. H. BERGREN.
PEDAL LOCK FOR AUTOMOBILES.
APPLICATION FILED OCT. 18, 1915.

1,261,828.

Patented Apr. 9, 1918.

WITNESSES
E. C. Skinkle
A. H. Opsahl

INVENTORS
William R. McKinnon
Charles H. Bergren
BY THEIR ATTORNEYS
Williamson Merchant

UNITED STATES PATENT OFFICE.

WILLIAM R. McKINNON AND CHARLES H. BERGREN, OF MINNEAPOLIS, MINNESOTA.

PEDAL-LOCK FOR AUTOMOBILES.

1,261,828. Specification of Letters Patent. Patented Apr. 9, 1918.

Application filed October 18, 1915. Serial No. 56,552.

*To all whom it may concern:*

Be it known that we, WILLIAM R. MC-KINNON and CHARLES H. BERGREN, citizens of the United States, residing at Minneapolis, in the county of Hennepin and State of Minnesota, have invented certain new and useful Improvements in Pedal-Locks for Automobiles; and we do hereby declare the following to be a full, clear, and exact description of the invention, such as will enable others skilled in the art to which it appertains to make and use the same.

Our invention relates to pedal locks for automobiles, particularly of the "Ford" type; and, to this end, generally stated, the invention consists of the novel devices and combinations of devices hereinafter described and defined in the claims.

In the accompanying drawings, which illustrate the invention, like characters indicate like parts throughout the several views.

Figure 2:
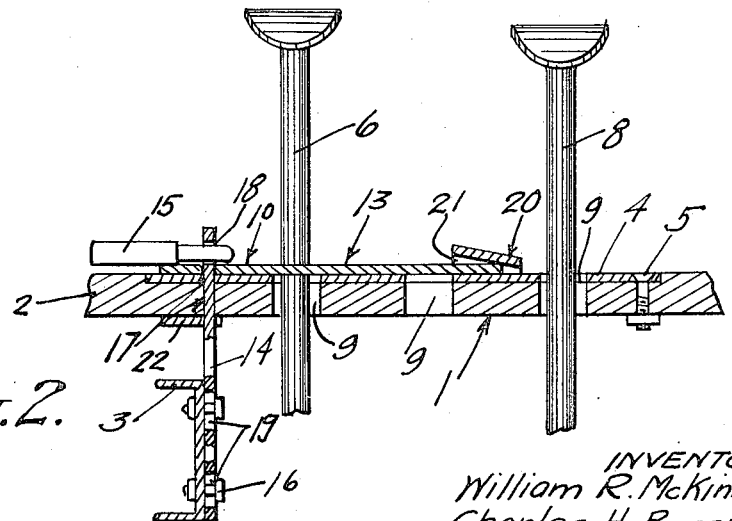

Referring to the drawings,

Figure 1 is a fragmentary view showing the invention applied to a Ford automobile with the clutch pedal locked in a neutral position and the reverse pedal locked in a disengaged position, some parts being shown in different positions by means of broken lines and some parts being shown in section with the removed parts illustrated by means of broken lines; and Fig. 2 is a vertical section taken on the irregular line $x^2$ $x^2$ of Fig. 1.

The numeral 1 indicates the upwardly inclined portion of the floor of an automobile and having a displaceable board 2. Underlying the displaceable board 2, is a channel bar 3, which forms a portion of the body structure of the automobile. A slotted metal plate 4 is rigidly secured by nut-equipped bolts 5 to the upper face of the displaceable board 2. The heads of these bolts 5 are counter-sunk in the metal plate 4 and their nut-equipped ends are located on the under side of the displaceable board. The numerals 6, 7 and 8 indicate, respectively, clutch, reverse and brake foot pedals, which work through slots 9 formed in the displaceable board 2 and metal plate 4. The parts thus far described are of the standard "Ford" type, but, of course, may be of any desired construction.

A hasp or lock plate 10 is pivoted at 11 to the metal plate 4, for parallel swinging movement with respect thereto, and also having a slight angular lifting movement. This hasp 10 is provided at its free end portion with the customary elongated lock slot 12. Integrally formed with one of the longitudinal edges of the hasp 10, is a relatively long finger 13 and a relatively short finger 13', spaced edgewise, one from the other, and the latter located between the finger 13 and pivot 11. The fingers 13 and 13' project across the path of movement of the clutch pedal 6, in either direction, and hold the same locked in a neutral position. The long finger 13 also projects across the path of movement of the reverse pedal 7 and locks the same in a disengaged position.

With the clutch and reverse pedals locked, as above described, the engine is disconnected from the driving wheels. Preferably, we do not lock the brake pedal 8, for the reason that it is often desirable to move the automobile by pushing the same, when its clutch and reverse pedals are locked, for instance, in case of fire.

To lock the hasp 10 in an operative position against both swinging and lifting movements, and also for locking the displaceable board 2 in position, we provide a lock lug 14 and pad-lock 15. As shown, the lock lug 14 is in the form of a metal strap rigidly secured by nut-equipped bolts 16 to the channel beam 3 and arranged to project through co-incident apertures 17 in the displaceable board 2 and plate 4, and also through the lock slot 12 of the hasp 10. The lock lug 14, above the hasp 10, is provided with a large perforation 18, through which the yoke of the pad-lock 15 is passed. Obviously, by rigidly securing the lock lug 14 to the channel bar 3 and locating the pad-lock 15 above the hasp 10, the displaceable board 2 is securely held in position.

The lock lug 14 is provided with vertical slots 19 to receive the nut-equipped bolts 16, in order that said lock lug 14 may be adjusted to bring the pad-lock 15 into close engagement with the hasp 10 to prevent lifting movement thereof by a tool placed under the hasp, in view of breaking the lock and releasing the foot pedals. To prevent the long finger 13 from being pried up or bent, we provide a metal strap 20, bent to form a socket 21. This socket 21 is arranged to receive the free end of the long finger 13, when in operative position. The strap 20 is riveted or otherwise rigidly secured to the plate 4 and the upper wall of the socket 21 is formed oblique to force the free end of the long finger 13 onto the plate 4. With the hasp 10 and its fingers 13 and 13' held in flat engagement with the plate 4 by the rivet 11, pad-lock 15 and socket strap 20, the clutch and reverse levers are securely held in neutral and disengaged positions, respectively.

Rigidly secured to the underside is a metal plate 22 notched to receive the lock lug 14 and assist in holding the same in position. With the clutch and reverse pedals securely held by the fingers 13 and 13' and with the displaceable board 2 locked into position, it is impossible to connect the engine with the driving wheel, or to lift said displaceable board, in view of disconnecting the fingers 13 and 13' from the held foot pedals, or to tamper with the mechanism under the displaceable board.

The above described invention, while of small cost to manufacture, has, in actual usage, proven highly efficient for the purpose had in view.

What we claim is:—

1. The combination with an automobile having two controlling levers, of a hasp pivotally secured at one end to a relatively fixed part of the automobile and having at its free end a pair of fingers, said two fingers arranged to embrace one of said levers and one of said fingers arranged to project in the path of movement of the other of said levers for holding said two levers in predetermined set positions, lock elements for securing the free end of the hasp to a relatively fixed part of the automobile, and a lock socket into which one of said fingers projects when in an operative position.

2. The combination with an automobile having laterally spaced levers, of a hasp pivotally secured at one end to a relatively fixed part of the automobile and having at its free end a relatively long finger and a relatively short finger, said two fingers arranged to embrace one of said levers and said long finger arranged to project in the path of movement of the other of said levers for securing said two levers in predetermined set positions, and lock elements for securing the free end of said hasp to a relatively fixed part of the automobile.

3. The combination with an automobile having rigidly secured to its body a slotted metal plate, and levers working through the slots in said plate, of a hasp pivoted to said plate and having a pair of fingers arranged to hold said levers in predetermined set positions, an anchored lock lug projecting from said slotted plate and through the lock slot of the hasp, a lock coöperating with the lock lug for securing the hasp thereto, and a lock socket on said slotted plate into which one of said fingers projects when in an operative position.

In testimony whereof we affix our signatures in presence of two witnesses.

WILLIAM R. McKINNON.
CHARLES H. BERGREN.

Witnesses:
HARRY D. KILGORE,
F. D. MERCHANT.

Copies of this patent may be obtained for five cents each, by addressing the "Commissioner of Patents, Washington, D. C."